E. SÁRKÖZY.
KNIFE.
APPLICATION FILED OCT. 21, 1916. RENEWED DEC. 1, 1919.

1,345,637. Patented July 6, 1920.

Eugene Sárközy.
Inventor
by
his Attorney

UNITED STATES PATENT OFFICE.

EUGENE SÁRKÖZY, OF NEW YORK, N. Y.

KNIFE.

1,345,637.      Specification of Letters Patent.      Patented July 6, 1920.

Application filed October 21, 1916, Serial No. 127,004. Renewed December 1, 1919. Serial No. 341,794.

*To all whom it may concern:*

Be it known that I, EUGENE SÁRKÖZY, a subject of the Emperor of Austria, residing at New York city, in the county and State of New York, have invented certain new and useful Improvements in Knives, of which the following is a specification.

My invention relates to an improvement in knives adapted particularly for use by furriers in fleshing or dehairing hides.

The principal object of the invention is to provide a novel form of handle or holder, so constructed as to permit of the ready insertion therein or the removal therefrom of blades of various sizes and styles.

One form of the invention is illustrated in the accompanying drawing, wherein—

The holder comprises two substantially similar handle members 2 and 3, which are adapted to be superposed, and clamp between them the blade 1. Each of the members 2 and 3 is substantially flat, and is cut away at its forward portion, as indicated at $2^a$ to allow for the projection beyond the holder of the cutting edge of the knife 1. Each of the members 2 and 3 is also provided with a pair of spaced projecting spurs or hooks $3^a$, which are alined in the longitudinal direction of each member, and are stamped up from the material itself, so that a slot is left in the member where the hook $3^a$ was formed. The hooks $3^a$ of one handle member extend in a direction opposite to that in which the hooks of the other handle member extend.

Figure 1:
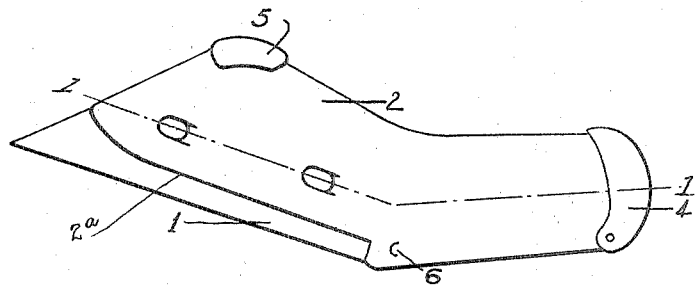
Figure 1 is a perspective view of the complete knife.
Figure 2:
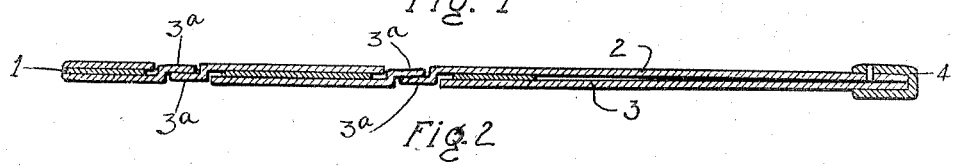
Fig. 2 is a vertical sectional view on the line 1—1 of Fig. 1.
Figure 4:
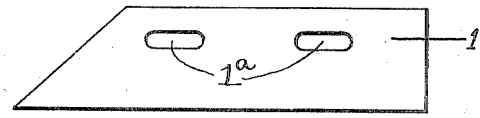
Fig. 4 is an elevational view of a form of blade which may be employed.
Figure 3:
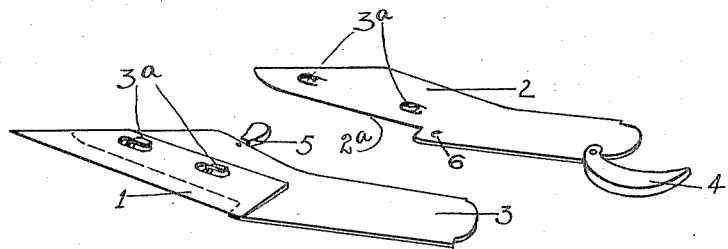
Fig. 3 is a perspective view illustrating the members of the handle or holder separated from each other.

The blade 1, which is preferably shaped as shown in Fig. 4, is provided with spaced elongated slots $1^a$, through which the hooks $3^a$ are adapted to project when the knife is assembled.

At its rear end one of the handle members, 2 or 3, is provided with a pivoted keeper 4, and near its front end the same or the other member is provided with a pivoted keeper 5, these keepers serving as clamps to hold the members 2 and 3 tightly together with the knife blade between them. An additional means for preventing shifting of the blade, and acting to move the same into position to be clamped between the members 2 and 3, is a spur 6 struck up from one of the members 2 or 3 and projecting inwardly therefrom.

To insert a blade 1 in position, the same is laid on one of the handle members so that the hooks $3^a$ thereof project through the slots $1^a$ in the blade. Then the other handle member is placed over the blade with its hooks $3^a$ passing through the slots $1^a$ and entering the slots under the hooks $3^a$ in the first handle member. Thereafter the handle members 2 and 3 are movable longitudinally in relation to each other, which will bring them into exact alinement, causing the hooks of the two members to interengage. During such longitudinal movement, the spur 6 will move the blade toward the forward end of the holder and when the parts are in this position the keepers 4 and 5 are turned into clamping position and the knife is ready for use. To remove the blade, the keepers 4 and 5 are moved out of clamping position, and the members 2 and 3 moved longitudinally in relation to each other until the hooks $3^a$ are out of engagement, whereupon the blade 1 may be freely removed.

I desire it to be understood that my invention is not limited to the form of the handle members or the blade as illustrated, and that modifications may be made without departing from the spirit of the invention as defined by the appended claims.

What I claim as new and desire to secure by Letters Patent is:—

1. A knife comprising handle members having projecting hooks adapted to engage with each other, the hooks of one handle member extending in a direction opposite to that in which the hooks of the other handle member extend and a blade adapted to be held between said handle members, said blade having slots through which said hooks are adapted to project.

2. A knife comprising handle members having projecting hooks adapted to engage with each other, the hooks of one handle member extending in a direction opposite to that in which the hooks of the other handle member extend, a blade adapted to be held between said handle members, said blade having slots through which said hooks are adapted to project, and means for clamping said handle members together.

3. A knife comprising handle members each of which is cut away at its forward portion and is provided with projecting hooks adapted to engage with each other, the hooks of one handle member extending in a direction opposite to that in which the hooks of the other handle member extend, a blade adapted to be clamped between said handle members, said blade having slots through which said hooks are adapted to project, and keepers pivoted to said handle members and adapted to clamp the same together.

In testimony whereof I have affixed my signature in presence of two witnesses.

EUGENE SÁRKÖZY.

Witnesses:
HENRY BAUMGARTEN,
ISIDOR FRIEDLANDER, Jr.